This invention relates to a process for making nuclearly chlorinated monoaryl thiols. More particularly, this invention relates to a process for the preparation of monochlorothiophenols of the following formula:

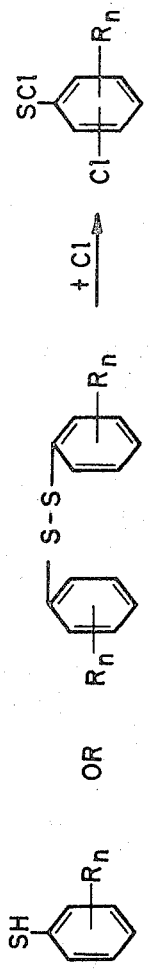
STEP 1 – CHLORINATION
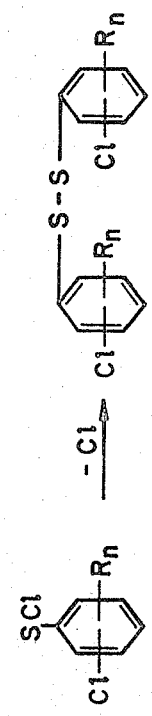
STEP 2 – DISULFIDE FORMATION
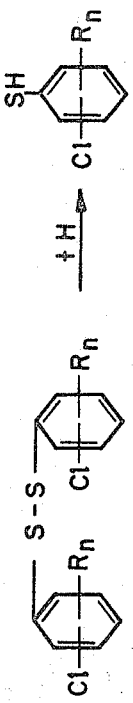
STEP 3 – CONVERSION OF DISULFIDE TO THIOL
INVENTOR.
ROBERT J. LAUFER
BY D. Leigh Fowler Jr.
ATTORNEY 3,331,205
PREPARATION OF CHLOROTHIOPHENOLS
Robert J. Laufer, Pittsburgh, Pa., assignor to Consolidation Coal Company, Pittsburgh, Pa., a corporation of Pennsylvania
Filed June 22, 1964, Ser. No. 376,902
5 Claims. (Cl. 260—609)

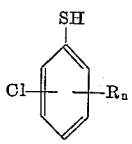

where the chlorine substituent may be either ortho or para to the SH group, R is an alkyl group, and $n=0$, 1 or 2.

Hitherto it has been the practice to make chlorothiophenols by introducing the SH group into an already chlorinated benzene or alkyl benzene. However, thiophenols are now commercially available at reasonable prices. Accordingly, it would be desirable to provide a process for converting thiophenols to chlorothiophenols, the latter being useful as intermediates in the manufacture of dyes and insecticides. In particular, parachlorothiophenol has become an important commercial chemical, its principal current use being as an intermediate in the synthesis of pesticides. It is made from chlorobenzene by chlorosulfonation, followed by metal-acid reduction. Unfortunately, such a process is too costly to yield a low priced parachlorothiophenol.

It is not possible, to the best of my knowledge, to introduce chlorine into the ring of a thiophenol without at the same time converting the SH group to SCl. In fact, as a rule, the conversion of the SH group to SCl occurs before any ring chlorination is effected. Thus, arylsulfenyl chlorides may be readily prepared by chlorinating aryl mercaptans to obtain essentially quantitative yields of the corresponding arylsulfenyl chlorides, as follows:

(1) 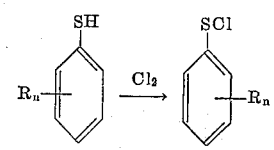

Similarly, arylsulfenyl chlorides may be readily prepared by chlorinating aryl disulfides, as follows:

(2) 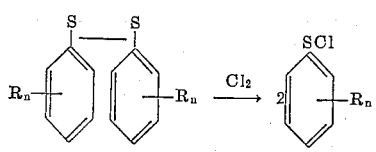

where R and $n$ in both Equations 1 and 2 have the same definitions as above.

The primary object of this invention is to provide a process for converting monoaryl thiols, or aryl disulfides, to chloro-monoaryl thiols.

In accordance with my invention, a process is provided for making monochlorothiophenols of the formula:

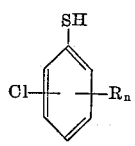

where the Cl atom occupies either an ortho or a para position. The process comprises three essential steps, as follows:

(1) Chlorination of a monoaryl thiol or an aryl disulfide, whereby a nuclearly chlorinated arylsulfenyl chloride is formed, (2) Conversion of the chloroarylsulfenyl chloride from Step 1 to a chloroaryl disulfide, and (3) Conversion of the disulfide from Step 2 to a nuclearly chlorinated monoaryl thiol.

By the practice of the above process, I have been able to produce chlorothiophenols in yields of 65 to 91 percent of theory.

For a better understanding of my invention, reference should be had to the following description and to the accompanying drawing in which the above-listed steps are presented in generalized form.

Referring to the drawing, the general reactions of the three steps will be discussed before presenting detailed examples of my process.

Step 1. *Chlorination.*—As shown in the drawing, either a monoaryl thiol or an aryl disulfide may be used as the feedstock. However, the aryl group must have at least one open position ortho to the S-atom that is occupied by hydrogen. Any suitable chlorinating agent may be employed in this step. I have used both chlorine itself and sulfenyl chloride with equal success. As stated earlier, the formation of arylsulfenyl chloride proceeds rapidly and nearly quantitatively. Furthermore, the reaction conditions may vary widely without significantly affecting yields. (See V. Migrdichian, Organic Synthesis, vol. 2, p. 1707, Reinhold Publishing Corp., New York, N.Y., 1957.) However, the introduction of chlorine into the ring requires more careful attention to the specific conditions if optimum yields are to be obtained, as will be more fully set forth in the examples.

In general, however, I prefer to operate this first step without a solvent, without a catalyst and within the temperature range of $-20°$ C. to about $100°$ C., the particular temperature depending upon the feedstock. The conversion to the sulfenyl chloride is, as stated, always total. The extent of nuclear chlorination depends largely on close control of temperature.

Step 2. *Disulfide formation.*—Sulfenyl chlorides are readily converted to the disulfides. (See E. Emmet Reid, Organic Chemistry of Bivalent Sulfur, vol. 1, p. 273, Chemical Publishing Co., Inc., New York, N.Y., 1948.) Zinc, mercury, potassium hydrosulfide, iodide ions, and lithium aluminum hydride are examples of agents for effecting the conversion. Another way of effecting such conversion is to react the chloroarylsulfenyl chloride with an aryl thiol, thus:

$$R'SCl + RSH \rightarrow R'S-SR + HCl$$

where R' stands for chloroaryl and R stands for an aryl group. The product disulfide is a "mixed" aryl disulfide, but for the purposes of this invention it makes no difference so long as at least one aryl group is nuclearly chlorinated.

In the copending application of Laufer and Neuworth, Ser. No. 377,084, filed on even date herewith, and assigned to the assignee of the present invention, the use of phosphorus is described as an outstandingly effective agent for converting organosulfenyl chlorides to disulfides. Accordingly, I prefer to use phosphorus in this second step. However, whatever agent is used to convert the sulfenyl chloride to the disulfide form, the chlorine attached directly to the sulfur atom is selectively removed, leaving a chloroaryl group.

Step 3. *Conversion of disulfide to thiol.*—The conversion of the disulfide to thiol may be readily effected in a number of ways, well-known in the art. Metal-acid treatment, for example, with zinc and hydrochloric acid is effective. In general, any reducing agent will serve the purpose. An interchange reaction may also be employed as follows:

$$R'-S-S-R' + 2RSH \rightarrow 2R'SH + R-S-S-R$$

where R' is a chloroaryl group and R is simply an aryl group.

The product resulting from this Step 3 contains principally a monochloroaryl thiol in which the chlorine atom is either ortho or para to the SH group. In the case of thiophenol itself, nuclear chlorination produces a product which is 12 to 20 percent ortho- and 80 to 88 percent para-substituted. Nuclear chlorination of para-alkylthiophenols yields principally 2-chloro-4-alkylthiophenols. Ortho-alkylphenols and metaalkylthiophenols give predominantly 4-chloro derivatives with up to five percent 6-chloro derivatives. A mixture of chloro derivatives is obtained from thioxylenols.

*Preferred embodiment.*—In the preferred embodiment of my invention, chlorine is added to the thiol or disulfide feedstock under reacting conditions until chlorine is no longer absorbed. While the specific reaction conditions depend upon the feedstock, in general no solvent is employed, no catalyst is used, the pressure is sufficiently above atmospheric to help to retain the chlorine in the reaction zone, and the temperature is maintained at the optimum point within the range between $-20$ and $+100°$ C. To the product so obtained is added phosphorus which reacts readily with the product to convert it to the disulfide and $PCl_3$. The disulfide is then reduced with zinc dust and hydrochloric acid to yield the desired nuclearly chlorinated aryl thiol.

The preferred embodiment, as well as alternative embodiments of my invention, are illustrated in the following examples.

In the following examples, the same apparatus was used, namely, a 2-liter, 4-necked flask fitted with a stirrer, thermometer, chlorine inlet tube, and a Dry Ice condenser. The latter was vented via a drying tube to a water scrubber which consisted of a large Erlenmeyer flask approximately half-filled with water and so arranged that a semi-quantitative estimate of the rate of hydrogen chloride evolution could be made.

EXAMPLE 1

*Preparation of 4-chloro-m-thiocresol*

The 2-liter, 4-necked flask was charged with 375 grams (3 moles) of m-thiocresol. The flask was purged with nitrogen, and 475 grams (about 6.5 moles) of chlorine gas were added as follows:

| Time | Temp., °C. | Wt. $Cl_2$ in (cumulative), grams |
|---|---|---|
| 9:13–9:45 | 16–28–20 | 120 |
| 9:45–10:07 | 20–13 | 220 |
| 10:07–11:11 | 14–16 | 475 |

The reaction mixture was warmed to 50° C. over a period of 16 minutes and evacuated for 10 minutes to remove any HCl and $Cl_2$. The apparatus was then arranged for phosphorus addition. That is, a water reflux condenser and drying tube replaced the Dry Ice condenser, and a phosphorus addition tube provided. Then, 37 grams of red phosphorus were added over 8 minutes with some cooling (water bath) to control the temperature rise. The temperature rose to 99° C. and was held at 99–101° C. for one hour. Then with the drying tube removed and the condenser vented to the scrubber, 400 ml. of $H_2O$ were added dropwise until the vigorous evolution of HCl had ended (resulting from reaction of water with $PCl_3$, the by-product of the conversion of the sulfenyl chloride to disulfide). The mixture was stirred briefly; then allowed to separate. The upper aqueous phase was removed by siphon (305 ml.). A second 400 ml. of $H_2O$ was added, the mixture stirred for several minutes, and again the upper phase removed by siphon. Total aqueous phase removed was 730 ml. The apparatus was then arranged for vacuum distillation, and the remaining water was removed under water pump vacuum to a pot temperature of 100° C. requiring 46 minutes.

The apparatus was purged with nitrogen and 125 grams of zinc dust were added at 47° C. (no evidence of any reaction). A solution of 410 ml. of concentrated HCl in 197 ml. $H_2O$ was added from a dropping funnel over a period of 76 minutes, while a temperature of 45 to 50° C. was maintained by periodic cooling. Vigorous stirring was maintained throughout. After completion of the addition of the concentrated HCl, the mixture was held at 49–54° C. for 3 hours. The temperature was then slowly raised to 80° C., (over a period of 35 minutes), where it was held for one hour. Gas evolution was greatest at the beginning of acid addition and gradually tapered off, but was still detectable almost to the end of the reaction period.

The cooled reaction mixture was vacuum-filtered through a glass filter, and the flask and cake washed with hexane. The filtrate was composed of an upper oil phase and a lower aqueous phase which were separated. The oil phase was combined with a 100 ml. hexane extract of the aqueous phase and washed with 100 ml. of brine, then with 80 ml. of brine, plus 20 ml. of 10 percent $NaHCO_3$. The wash liquors contained some oil emulsion and were extracted with successive treatments of 100 ml. and 50 ml. of hexane. The combined oil phases in hexane were dried over $MgSO_4$ under nitrogen.

The hexane oil solution was fractionally distilled. Then, 39.8 grams of m-thiocresol and 269.4 grams of 4-chloro-m-thiocresol were recovered. The yield of 4-chloro-m-thiocresol was 63 percent based on a conversion of m-thiocresol of 89.3 percent.

EXAMPLE 2

*Preparation of 4-chloro-o-thiocresol*

The 2-liter, 4-necked flask was charged with 498 grams of o-thiocresol (4 moles) and 662 grams (about 9.5 moles) of chlorine gas were added over a period of about 5 hours. The temperature was held at 21 to 40° C. for the first 30 minutes, then between 0 to 20° C. for the balance of the time. At the end of the chloroination, the system was evacuated to remove free chlorine and HCl.

Instead of using phosphorus to effect the conversion to disulfide, thiophenol was used thusly:

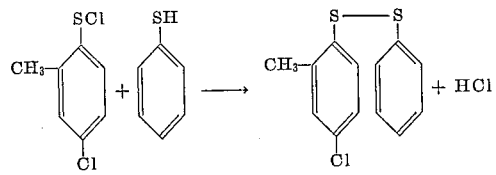

Thiophenol (500 grams or 4.53 moles) was added dropwise to the stirred reaction mixture over a period of about 30 minutes at a temperature of 37 to 45° C. Since HCl continued to evolve, an additional 150 grams of thiophenol were added at 40° C. and more HCl was evolved. The temperature was raised to 105° C. over a period of 48 minutes and was maintained at that point under reduced pressure (25 mm.) for 5 minutes.

The resulting reaction mixture was transferred to a five-liter flask, fiitted with a stirrer, reflux condenser, dropping funnel, and thermometer. Then, 392 grams of zinc powder were added, followed by slowly adding 3000 ml. of 6 N HCl. The temperature, by cooling, was held at about 40–50° C. When the reaction slowed down, heat was supplied to raise the temperature to about 100° C. The oil in the product was taken up in toluene, washed free of acid with brine, and dried over $MgSO_4$. The dried oil was fractionally distilled, yielding 214.7 grams of o-thiocresol and 309.0 grams of chloro-o-thiocresol. Thus the yield of chloro-o-thiocresol was 85.6 percent based upon a conversion of 56.8 percent of the o-thiocresol. About 95 percent of the product chloro-o-thiocresol was 4-chloro-o-thiocresol, the balance being 6-chloro-o-thiocresol.

EXAMPLE 3

Preparation of 2-chloro-p-thiocresol

The same procedure as set forth in Example 2 was applied to para-thiocresol, except that the temperature maintained during the latter part of the chlorination step was 45 to 50° C. instead of 0 to 20° C. Thus it appears that nuclear chlorination of p-thiocresol occurs most effectively at somewhat higher temperatures than are optimum in the case of meta- and ortho-thiocresol. The conversion of para-thiocresol was 90.7 percent; the yield of 2-chloro-p-thiocresol was 64 mole percent based on the converted feedstock.

EXAMPLE 4

Preparation of p-chlorothiophenol and o-chlorothiophenol

A one-liter, 3-necked flask fitted with a stirrer, thermometer, and Dry Ice condenser vented via a drying tube to a water scrubber was charged with 160.5 grams (0.735 mole) of a free-flowing crystalline diphenyl disulfide. Chlorine was then added via the condenser by distillation from a graduated glass cylinder containing 157.8 grams (102 ml.) of liquid chlorine. The temperature rose slowly from the initial 20° C. and the crystalline disulfied quickly reacted with the chlorine to form a deep red liquid. Stirring was commenced as soon as possible. When the temperature had reached 39° C., a cold (15° C.) water bath was temporarily used to reduce the temperature to 28° C. After an addition period of 41 minutes, during which 42 ml. of chlorine was charged, the temperature had again risen to 35° C., and the final stage commenced with increased exothermicity and the generation of voluminous amounts of hydrogen chloride. The temperature was controlled at 35–40° C. during the remainder of the addition period (69 minutes) by external cooling. Heating was required to maintain the temperature near the end of the addition as some chlorine began to reflux in the condenser. After an additional one hour, chlorine had ceased to reflux and hydrogen chlorine evolution had stopped. The resulting red liquid was degassed by evacuating with a water aspirator for 20 minutes at 35–40° C. The net weight of chlorination product was 266.2 grams. Theoretical weight for 1.47 moles of chlorobenzenesulfenyl chloride is 263.5 grams. If the temperature during the final chlorination step is too low or too high, the amount of chlorine absorbed, and hence, the conversion relative to nuclear halogenation, will be less. Attempts to charge the chlorine too fast will cause rapid refluxing from the condenser with cooling of the reaction mixture below the proper temperature. Best results have been obtained when the final stage of the reaction, i.e., during the evolution of hydrogen chloride, is carried out at 35–40 °C.

The reaction mixture prepared above was cooled to 19° C. and 169.4 grams (1.53 moles) of 99+ percent thiophenol was added dropwise with cooling and stirring. Cessation of hydrogen chloride evolution and disappearance of the red-orange color indicated completion of the reaction. The resulting clear, light yellow oil weighed 380 grams after vacuum degassing. On standing at room temperature, a small amount of diphenyl disulfide may crystallize from the reaction mixture.

A 300 ml. rocking autoclave was charged with 120 grams of the mixed disulfides obtained above and 15 grams of 20 percent molybdenum sulfide on alumina and the mixture was hydrogenated at 1700–2900 p.s.i.g. of hydrogen at 200° C. for 3.25 hours. The cooled contents were filtered and the filtrate fractionated on a spinning band column to yield 63.6 grams of thiophenol (B.P. 85° C./50 mm. Hg) and 46.5 grams of chlorothiophenol (B.P. 120° C./50 mm. Hg). The latter was found to contain 84 percent para-isomer by infrared quantitative analysis.

The results for the conversion of thiophenol (as both disulfide and thiol) to chlorothiophenol indicate a conversion of 39.2 percent with a 13.7 percent yield of o-chlorothiophenol and a 72.9 percent yield of p-chlorothiophenol.

EXAMPLE 5

Preparation of p-chlorothiophenol

To 160.5 grams (0.735 mole) of diphenyl disulfide was added 298.3 grams of sulfuryl chloride dropwise with stirring. The temperature dropped steadily, i.e., the dissolution process was strongly exothermic. After ca. 40 percent of the $SO_2Cl_2$ had been added, the temperature had reached −10° C. The reaction mixture was warmed slowly to 14° C. and the remainder of the $SO_2Cl_2$ was added at 14–20° C. (total time 52 minutes) with external heating. Gas evolution began at −5° C. and proceeded at a moderate rate at 14–20° C. After 2.5 hours at 20° C., the reaction temperature was raised to 47° C. (1 hour) where it was maintained until gas evolution had virtually ceased (1.5 hours). The system was evacuated to 50 mm. for 11 minutes at 49° C. The resulting red oil weighed 260.2 grams, compared to the theoretical weight of 263.5 grams for chlorobenzenesulfenyl chloride.

The reaction mixture was treated with 170.2 grams of thiophenol at 20–56° C. to yield, after vacuum degassing, 372.8 grams of an amber oil. Hydrogenation of an aliquot of the latter at 200° C., 1700 p.s.i.g. hydrogen for 3 hours over 20 percent $MOS_2$ on alumina in the absence of solvents yielded, on distillation, the following product distribution, calculated on the basis amounts of diphenyl disulfide and thiophenol employed in the chlorination step; thiophenol, 185.5 grams or a conversion of 44 percent; chlorothiophenol, 162.5 grams; 85 percent yield based on converted thiophenol (as disulfide and thiol) and containing 81 percent para-isomer by infrared analysis. The residue weighed 5.2 grams.

EXAMPLE 6

Preparation of p-chlorothiophenol

A one-liter, 3-necked flask with stirrer, gas inlet, thermometer and Dry Ice condenser vented via a drying tube to a water scrubber, was charged with 110 grams (one mole) of 99.9 percent purity thiophenol. Chlorine, 142 grams (2 moles) was added by distillation from a calibrated glass vessel containing 92 ml. of the liquefied halogen. During the first stage, i.e., the formation of diphenyl disulfide, the temperature was permitted to rise from 19° C. initial to 62° C. The reaction mixture was largely crystalline at this point and 26 ml. of chlorine had been charged over a period of 36 minutes. As chlorine addition was continued, the crystalline disulfide gradually liquefied and the temperature was slowly lowered to 24° C. by external cooling over a period of 24 minutes during which an additional 24 ml. of chlorine had been charged. As hydrogen chloride evolution began, thereby signalling the final stage of the reaction, the temperature was allowed to rise to a maximum 52° C. and averaged 45° C. The remainder of the chlorine was added over a period of 65 minutes; and after an additional 45 minutes at 37–50° C. the system was evacuated to 50 mm. to yield 167.6 grams of red oil.

The latter was reacted with 109.4 grams of thiophenol to yield, after vacuum degassing, 246.4 grams of a deep red oil.

The crude reaction mixture was treated with 75 grams of technical grade zinc powder with stirring at 30° C. Then 560 ml. of 6 N aqueous hydrochloric acid was added slowly over a period of 32 minutes at 32–70° C. Finally, the reaction mixture was heated to 100° C. (28 minutes) and was stirred an additional one hour at 100–68° C. The cooled reaction mixture was filtered through glass cloth and the organic portion extracted with toluene. Distillation yielded 134.7 grams of thiophenol for a 38.6 percent conversion of disulfide and thiol combined, 86.2 grams of chlorothiophenol or a yield of 77.5 percent based on converted thiophenol equivalents. The product contained 82 percent para-isomer by infrared analysis.

In the preceding three Examples 4, 5 and 6, the desired product, chlorothiophenol, is a mixture of the ortho-isomer and the para-isomer, predominantly the latter. They may be readily separated by fractional crystallization, as illustrated by the following demonstration. A mixture of 91 grams of ortho-chloro-thiophenol and 454 grams of para-chlorothiophenol obtained from the large-scale chlorination of diphenyl disulfide and two-step reduction of the resulting sulfenyl chloride was allowed to crystallize at room temperature (22° C.). The liquid was decanted from the crystal mass to yield 141.2 grams of oil containing 39.1 percent ortho-isomer. The solid (403.0 grams) contained 96.3 percent para-isomer. A 396.7 gram portion of the latter fraction was taken up in 100 ml. of hexane at 60° C. and the solution cooled slowly with stirring to 20° C. Crystallization began at 40° C. The crystal slurry was vacuum-filtered and the cake washed with 50 ml. of hexane to yield, after air-drying for 20 minutes, 318.9 grams of p-chlorothiophenol (100 percent by infrared), M.P. 51–55° C.

EXAMPLE 7

*Preparation of 2-chloro-p-(t-butyl)thiophenol*

The same procedure was used as was described in Example 2, except that (1) the temperature of chlorination was 67 to 87° C. and (2) t-butylthiophenol was used instead of thiophenol to effect the conversion of the sulfenyl chloride to the corresponding disulfide. The conversion of the p-(t-butyl)thiophenol was 91.4 percent; and the yield of 2-chloro-p-(t-butyl)thiophenol was 35.1 mole percent.

EXAMPLE 8

*Preparation of 4-chloro-2-isopropylthiophenol*

The same procedure was used as was described in Example 2, except that the temperature of chlorination was −4° C. to 0° C. The conversion of o-isopropylthiophenol was 52.7 percent; and the yield of 4-chloro-2-isopropylthiophenol was 87.8 mole percent.

EXAMPLE 9

*Preparation of 6-chloro-2,4-thioxylenol*

The procedure used was the same as that described in Example 2, except that the starting material was bis(2,4-xylyl)disulfide, instead of the corresponding thio, and the temperature of chlorination was −16 to 2° C. The conversion was 47.5 percent; and the yield of 6-chloro-2-,4-thioxylenol was 70.0 mole percent.

EXAMPLE 10

*Preparation of chloro-2,6-thioxylenol*

Attempts to ring-chlorinate 2,6-thioxylenol were unsuccessful. For this reason, I conclude that at least one ortho- position must be open.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:
1. The process for making a chloromonoaryl thiol which comprises
   (a) chlorinating a compound selected from the class consisting of monoaryl thiols and aryl disulfides in both of which the aryl group has at least one open ortho position to form a chloromonoarylsulfenyl chloride,
   (b) converting said chloromonoarylsulfenyl chloride to a disulfide, and then
   (c) converting said disulfide from step (b) to a chloromonoaryl thiol.

2. The process for making a chloromonoaryl thio which comprises
   (a) chlorinating a monoaryl thiol having at least one open ortho position to form a chloromonoarylsulfenyl chloride,
   (b) converting said chloromonoarylsulfenyl chloride to a disulfide, and then
   (c) converting said disulfide to a chloromonoaryl thiol.

3. The process for making a chloromonoaryl thiol which comprises
   (a) chlorinating a monoaryl thiol having at least one open ortho position at a temperature within the range of −20° C. to 100° C., to form a chloromonoarylsulfenyl chloride,
   (b) subjecting said chloromonoarylsulfenyl chloride to treatment with phosphorus, to convert said chloride to a disulfide, and then
   (c) reducing said disulfide to a chloromonoaryl thiol.

4. The process of claim 3 in which the monoaryl thiol used in step (a) is a thiol selected from the class consisting of thiophenol and alkylated thiophenols.

5. The process of claim 3 in which the monoaryl thiol used in step (a) is m-thiocresol.

References Cited

Migrdichian: Organic Syntheses, vol. 2, pp. 1707–8 (1957).

Reid: Organic Chemistry of Bivalent Sulfur, vol. 1, p. 273 (1958).

Reid: Organic Chemistry of Bivalent Sulfur, vol. 3, p. 378 (1960).

CHARLES B. PARKER, *Primary Examiner.*

DELBERT R. PHILLIPS, *Assistant Examiner.*